(12) United States Patent
Schwenger et al.

(10) Patent No.: US 10,464,029 B2
(45) Date of Patent: Nov. 5, 2019

(54) INGREDIENT MIXING APPARATUS HAVING AIR AUGMENTATION

(71) Applicant: BAKERY CONCEPTS INTERNATIONAL, LLC., Mechanicsburg, PA (US)

(72) Inventors: Kenneth W. Schwenger, Mechanicsburg, PA (US); Bernhard Noll, Michelbach / Bilz (DE)

(73) Assignee: Bakery Concepts International, LLC, Mechanicsburg, PA (US)

( * ) Notice: Subject to any disclaimer, the term of this patent is extended or adjusted under 35 U.S.C. 154(b) by 0 days.

(21) Appl. No.: 16/297,961

(22) Filed: Mar. 11, 2019

(65) Prior Publication Data
US 2019/0282978 A1 Sep. 19, 2019

Related U.S. Application Data

(60) Provisional application No. 62/642,134, filed on Mar. 13, 2018.

(51) Int. Cl.
*B01F 5/00* (2006.01)
*B01F 5/20* (2006.01)
*B01F 5/04* (2006.01)
*A21C 1/14* (2006.01)

(52) U.S. Cl.
CPC ............... *B01F 5/205* (2013.01); *A21C 1/14* (2013.01); *B01F 5/045* (2013.01); *B01F 5/048* (2013.01); *B01F 2005/0051* (2013.01); *B01F 2215/0011* (2013.01)

(58) Field of Classification Search
CPC .......... B01F 5/045; B01F 5/205; B01F 5/048; B01F 2005/0051; B01F 2215/0011; A21C 1/14
See application file for complete search history.

(56) References Cited

U.S. PATENT DOCUMENTS

| | | | | |
|---|---|---|---|---|
| 2,726,118 | A | * 12/1955 | Jones | .................... B05B 7/1404 239/400 |
| 4,369,689 | A | * 1/1983 | Donaghue | ............. B01F 5/0256 118/303 |
| 7,332,190 | B2 | 2/2008 | Noll | |
| 10,195,572 | B2 | 2/2019 | Hatch et al. | |
| 2008/0144425 | A1 | 6/2008 | Etzenbach | |
| 2011/0085407 | A1 | 4/2011 | Matsuda et al. | |

* cited by examiner

*Primary Examiner* — Anshu Bhatia
(74) *Attorney, Agent, or Firm* — Volpe and Koenig, P.C.

(57) ABSTRACT

The hydration apparatus includes an air augmentation feature that intersects the ingredients. The air augmentation inlet is positioned to cause turbulence in the ingredients prior to the ingredients passing a liquid discharge nozzle that hydrates them.

18 Claims, 10 Drawing Sheets

INGREDIENT MIXING APPARATUS HAVING AIR AUGMENTATION

INCORPORATION BY REFERENCE

This application claims the benefit of U.S. Provisional Patent Application 62/642,134, filed Mar. 13, 2018, which is incorporated herein by reference as if fully set forth.

FIELD OF INVENTION

The present disclosure relates generally to an apparatus for hydrating and mixing dry granulated materials. More particularly, the invention relates to an apparatus for hydrating dry granulated materials in a consistent and uniform manner. Most particularly, the invention relates to apparatus for hydrating and mixing flour-like dry granulated materials that is augmented with an air flow to more consistently produce a uniform mix.

BACKGROUND

Hydrating mixing chambers are known and hydration chambers that include ambient air are also known. While the known chambers have improved both the hydration and mixing of ingredients, there is still a desire to have better distribution or separation of the ingredients presented for hydration.

Feeding flour with a mechanical feeder, such as a screw feeder, means the bulk of the flour is transported by forces from the back pushing the flour through a pipe. These forces result in compacting of the flour. In addition, granular materials, like flour, are often stored in large quantities and the stored material has an angle of repose at which it wants to be stable. The resulting compaction impacts hydration and needs to be overcome. Consequently, when the flour reaches the exit of the flour feeder, the flour had been compressed in some part into aggregates of the granular material.

Flour behaves differently when its internal forces are eliminated and it becomes fluidized. When fluidized, flour can be handled similar to liquids. Specifically, clumps are broken into flour particles with a larger and more available surface area. The advantage to hydrated fluidized flour is reflected in the mixing result. The more even the flour feeding occurs, the more homogenous the mixed result.

SUMMARY

The apparatus uses supplemental air augmentation to improve the distribution of the material presented to the mixing chamber for hydration. The air augmented mixing chamber can hydrate a variety of dry ingredients, such as flour, bran, whole wheat, a full range of hydrocolloids and whole grains. Air augmentation preferably is applied directly in the hydration and mixing apparatus of an ingredients feed system associated with the mixing chamber.

BRIEF DESCRIPTION OF THE DRAWINGS

The invention will be more fully understood by reading the detailed description in conjunction with the following drawings wherein.

DETAILED DESCRIPTION OF PREFERRED EMBODIMENTS

Figure 1:
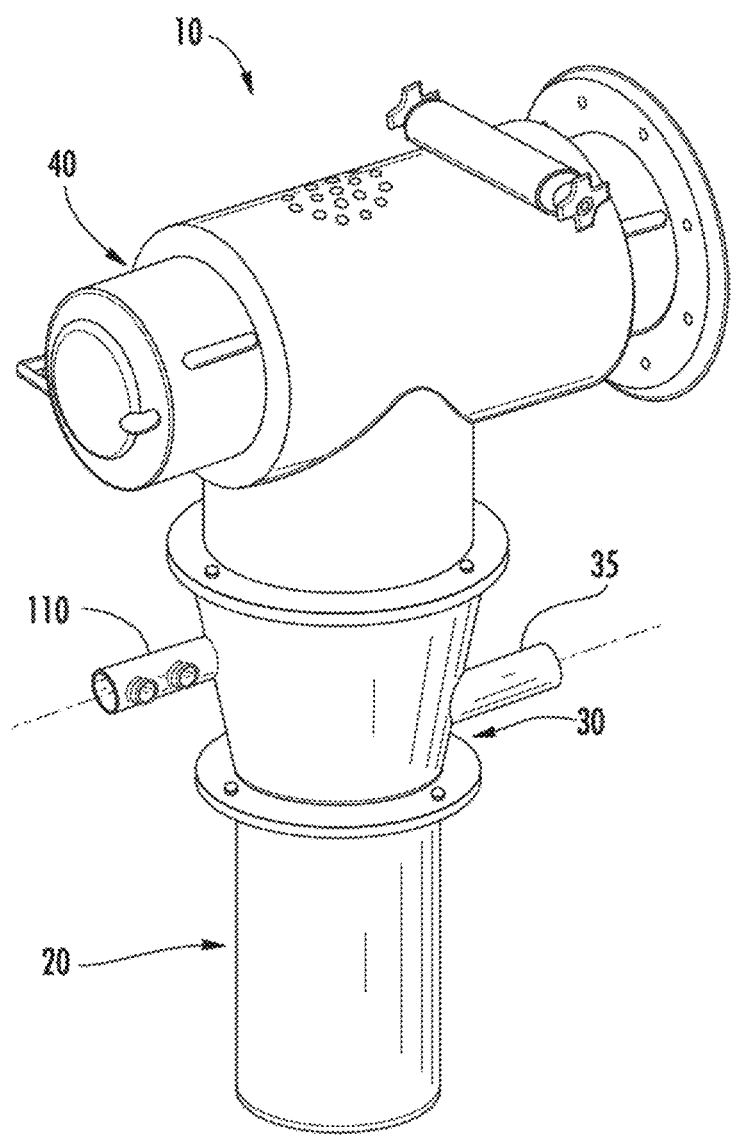
FIG. 1 illustrates a mixing apparatus, such as that described in U.S. application Ser. No. 15/532,503, which was filed on Jun. 2, 2017, that is modified with the addition of air augmentation.
Figure 2:
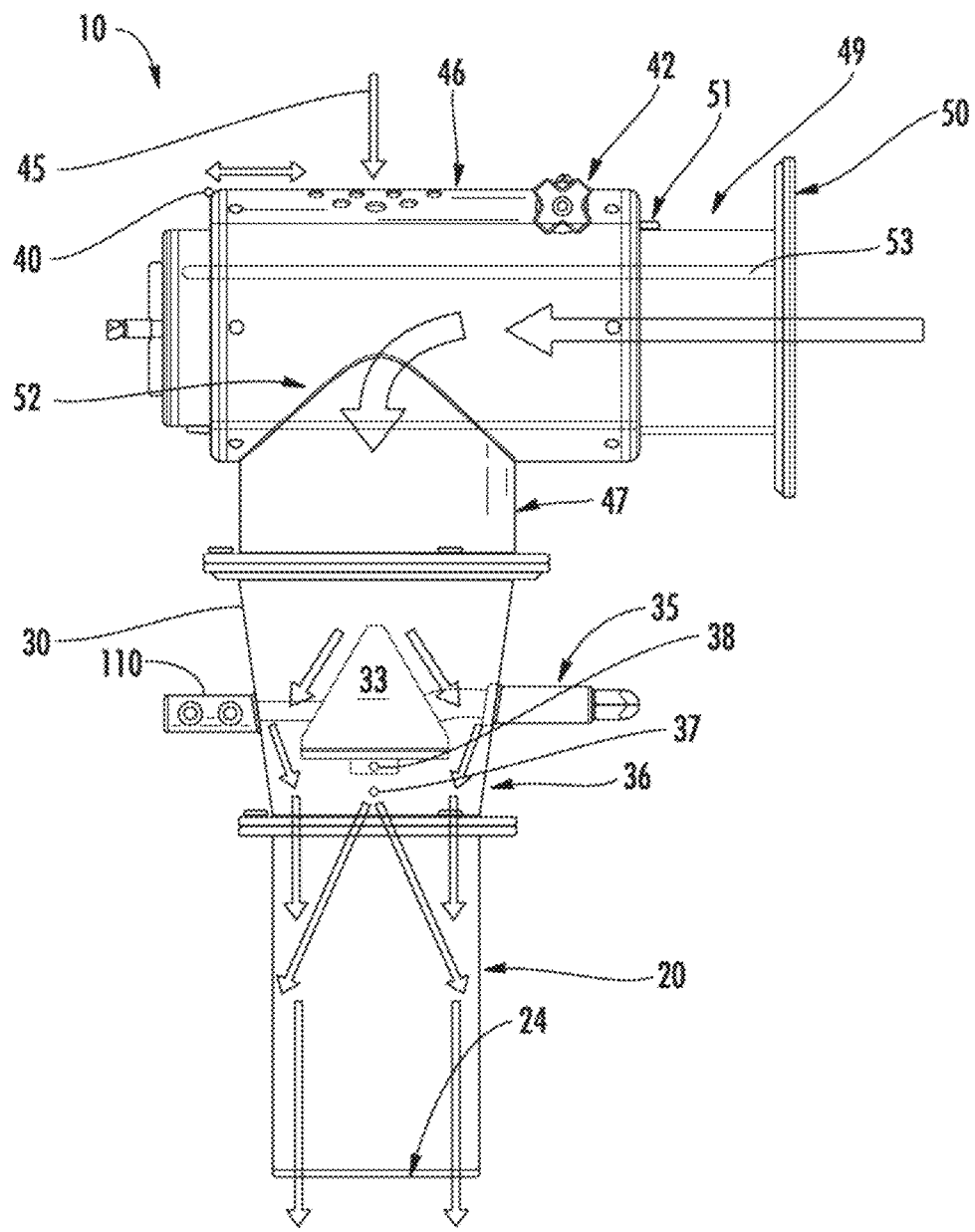
FIG. 2 illustrates the ingredients flow path.
Figure 3:
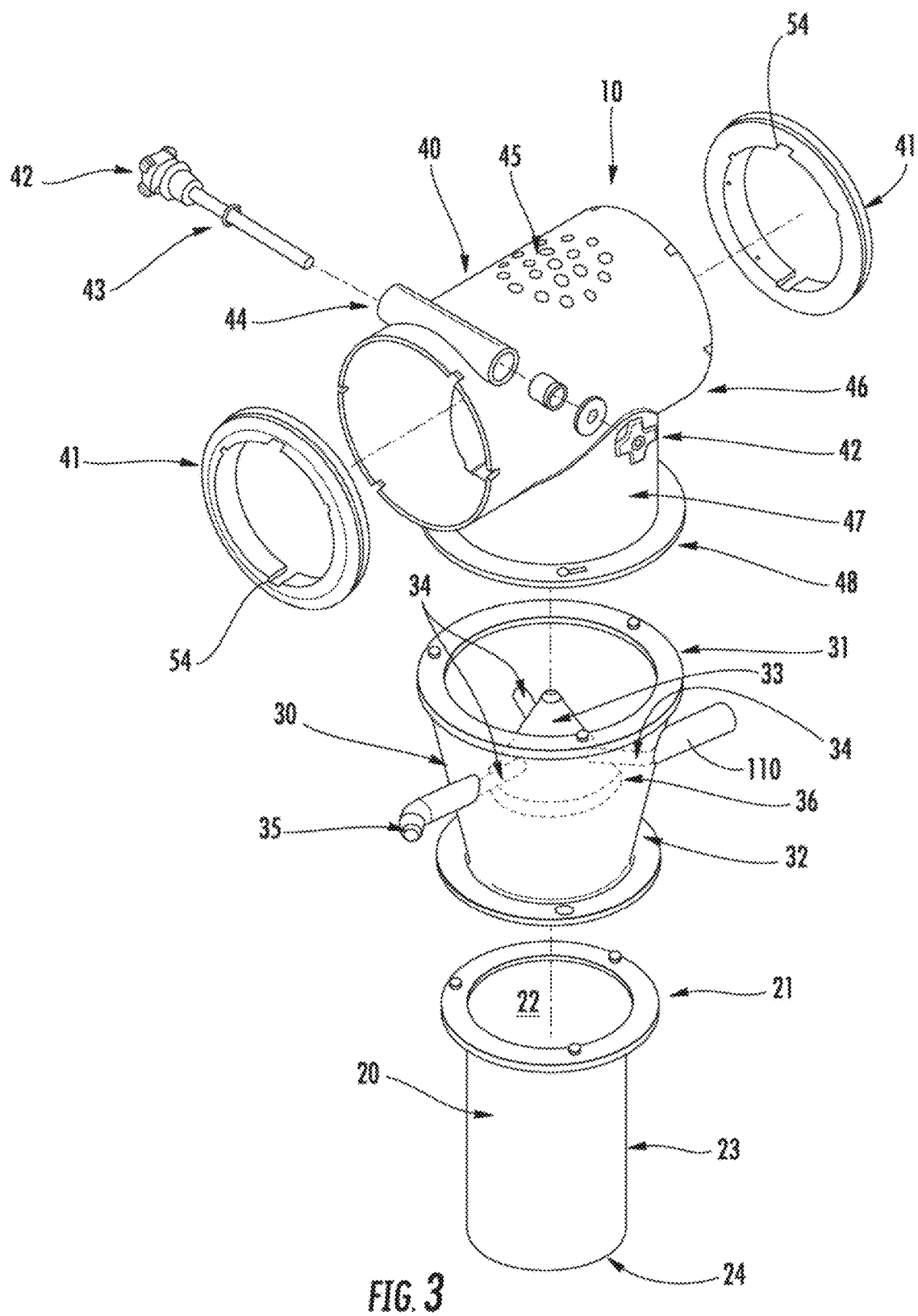
FIG. 3 is an exploded view that illustrates the location of the air supply relative to the ingredients diverter.

With reference to FIGS. 1 through 3, a preferred mixing apparatus 10 includes a dry ingredients inlet 40, an accumulation chamber 30, and a mixing section 20. The accumulation chamber 30 includes a diverter 33, which distributes ingredients so they flow outwardly toward the walls of accumulation chamber 30 and mixing section 20. The accumulation chamber 30 may include a tapered portion 36 that has a taper that is opposite to the taper of the diverter 33. With this configuration, the tapered portion 36 redirects ingredients inwardly toward the hydrating spray 37. The hydration spray 37 from the discharge from spray nozzle 38 is preferably under pressure and directed downwardly against the dry ingredients as they exit the accumulation chamber 30 and enter the mixing section 20.

The air inlet holes 45 in FIGS. 2 and 3 allow ambient air to enter the dry ingredients metering inlet 40 to avoid an undesirable vacuum in the presentation of the dry ingredients; however, this ambient air is not sufficient to fluidize the dry ingredients.

Preferably, the hydration liquid is applied as a spray in a pressure range between 10 bar (approximately 145 psi) and 300 bar (approximately 4,350 psi). Because different ingredients best absorb moisture at different pressures, the pressure will vary according to the ingredients presented. For instance, wheat bran has low density and hydrates at pressures between 20 bar (approximately 290 psi) and 69 bar (approximately 1,000 psi) while granulated white sugar hydrates at 137 bar (approximately 2,000 psi). Hydrating wheat gluten at pressures exceeding 69 bar (approximately 1,000 psi) produces a dough mix. Conversely, when wheat gluten is hydrated at 20 bar (approximately 290 psi) it does not absorb as much moisture and this results in a homogenous liquid batter.

Figure 4:
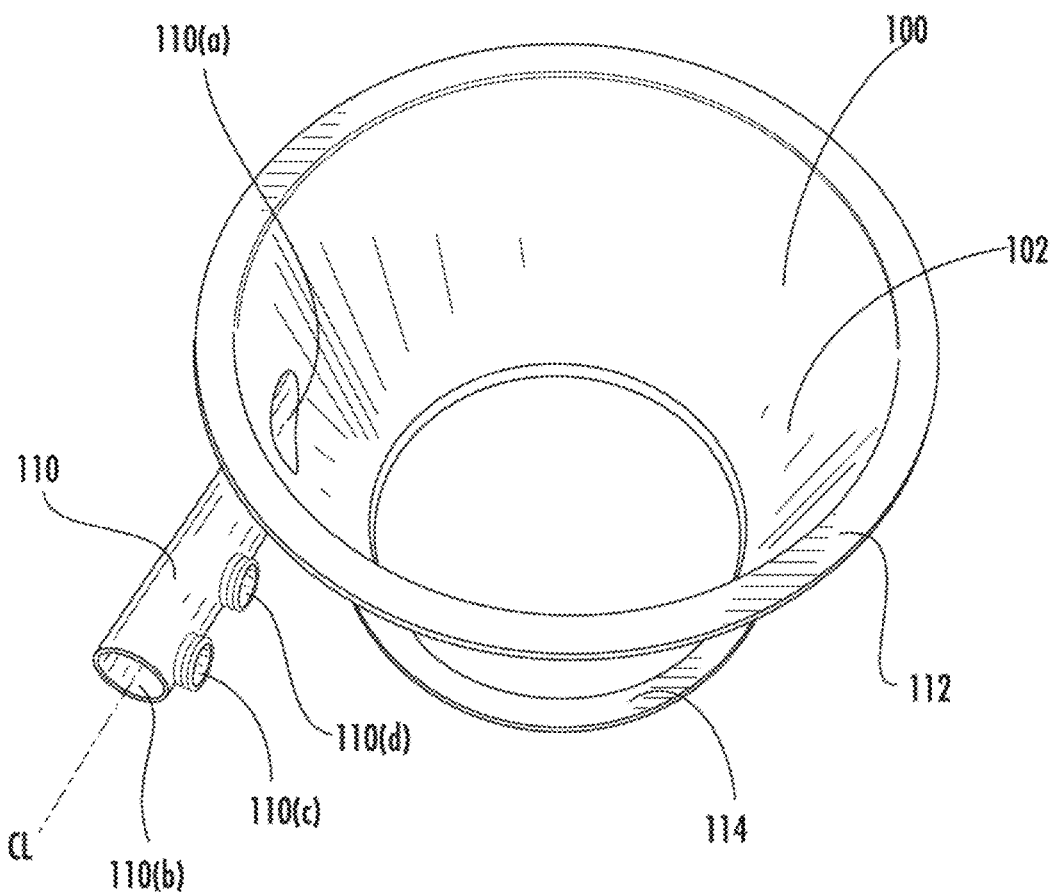
FIG. 4 illustrates one location for the air supply in the flow path.

With reference to FIGS. 1 through 3, the apparatus is modified with an air augmentation inlet 110 between the ingredients tube 47 with free falling ingredients and the diverter 33. Referring now to FIG. 4, it can be seen that the air augmentation inlet 100 is configured to conform to the inside wall 102 so that the inlet end 110(a) does not interfere with the flow path.

The centerline CL through the inlet 110 is angled between 5°-20° from the horizontal plane of the upper rim 112 so that the air flow is downward and moves the ingredients toward the hydration spray. This downward orientation of the centerline avoids a back pressure that moves ingredients upwardly and avoids turbulence that may interrupt the flow of the ingredients.

This orientation of the inlet 110 also tends to move the air around the interior wall 102 in a downward direction. This air movement agitates the ingredients so that they are separated and fluidized before presentation to the hydration liquid.

Depending on the characteristics of the specific ingredients, the air pressure presented to the air augmentation inlet 110 is between 2 and 5 bar (approximately 30 to 70 PSI). In the testing of different flours for common dough, it was found that air pressures between 2.4 to 3.1 bar (approximately 35 to 45 PSI) satisfactorily fluidized or dispersed the dry ingredients and reduced large visible lumps as noted above.

Figure 5:
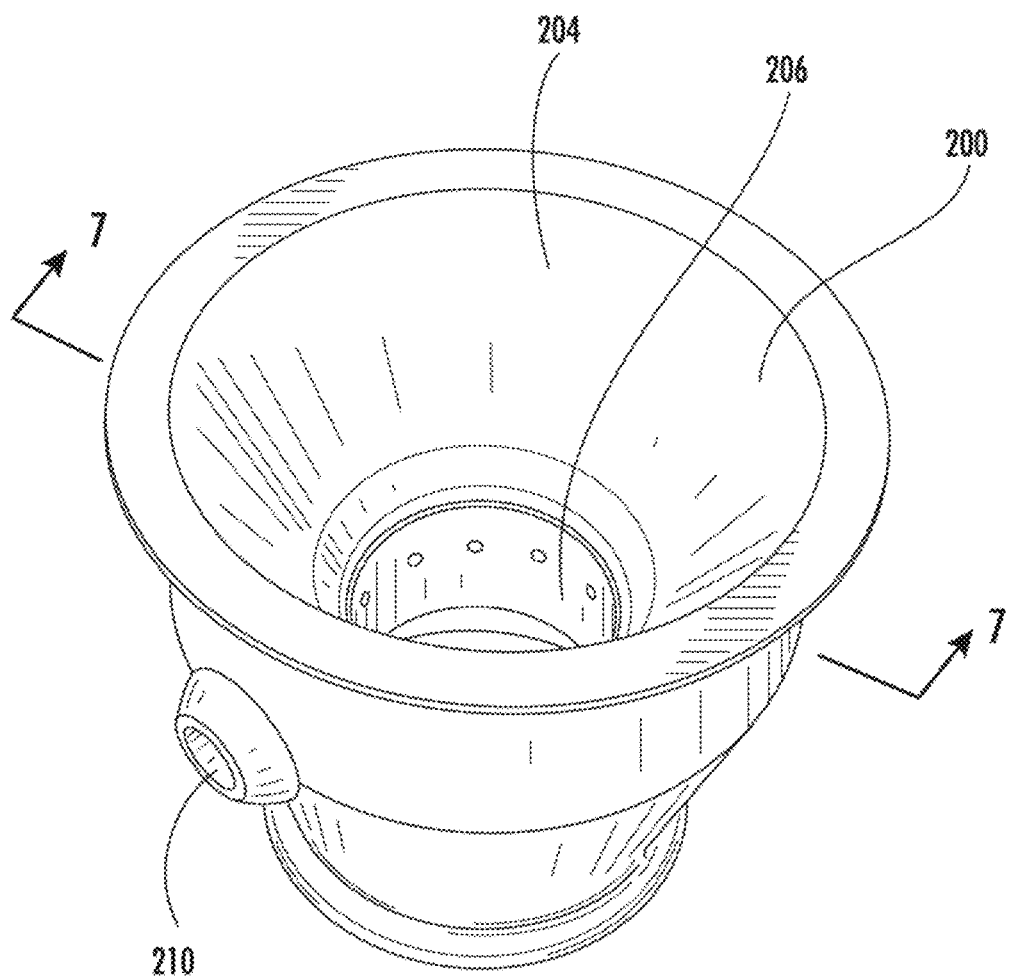
FIG. 5 illustrates an alternative air location and distribution arrangement.
Figure 6:
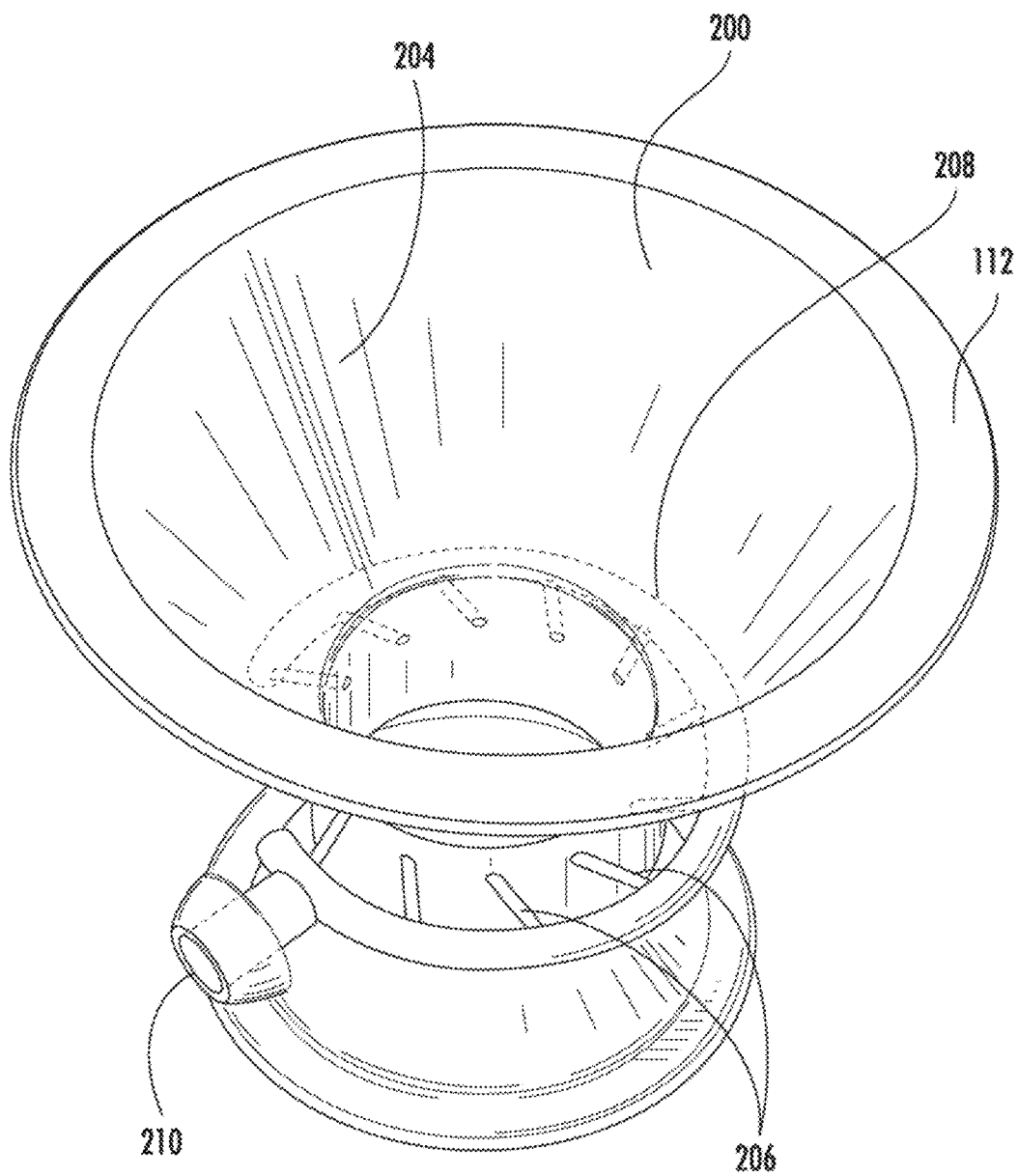
FIG. 6 illustrates another alternative air location and distribution arrangement.
Figure 7:
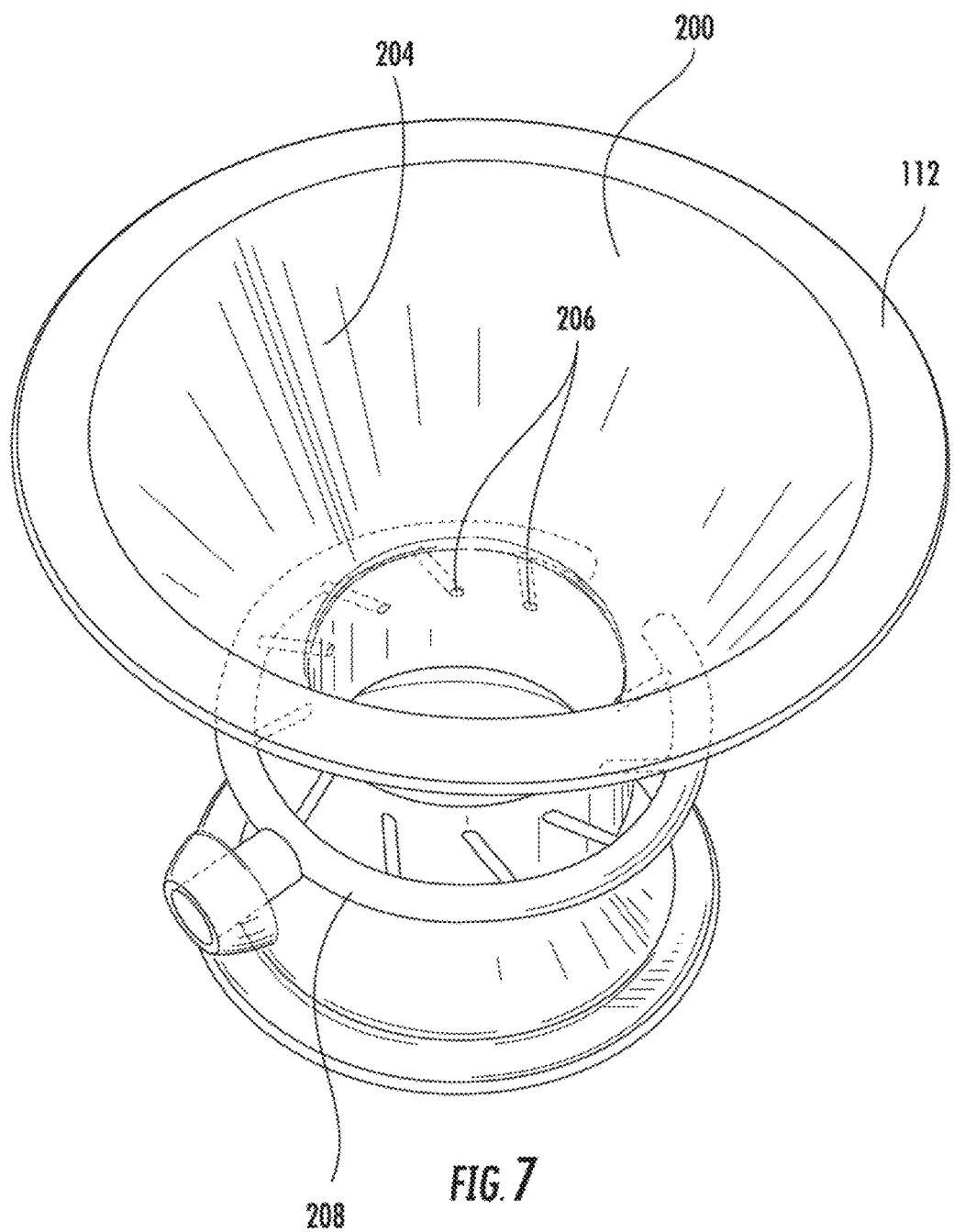
FIG. 7 illustrates another alternative air location and distribution arrangement.

In the embodiments shown in FIGS. 5 through 7, the interior wall 204 has a plurality of air tubes 206 passing through it and into the accumulation chamber so there are multiple points of air insertion. An air augmentation inlet 210 is connected to a distribution duct that may be internal to the accumulations chamber if it is double walled or external around the exterior of the accumulation chamber. In either configuration, the inlet 210 supplies the air tubes 206, which are located so they are between the dry ingredients and the diverter 33.

The air tubes are angled in the horizontal plane with respect to a vertical centerline through segment 200 so that they are not radii to that centerline and are downwardly angled with respect to upper rim 112. This orientation urges fluidized ingredients toward the diverter 33 and the hydration nozzle 38.

With reference to FIGS. 6 and 7, the distribution duct 208 may be generally circular or horse shoe shaped as it extends around the accumulation chamber from the inlet 210. In both configurations the terminal end or ends have a pressure relief valve that is set according to the selected pressure supplied at inlet 210. This arrangement permits continued balanced air flow without building back pressure from a closed end or losing pressure from an opened end.

Figure 8:
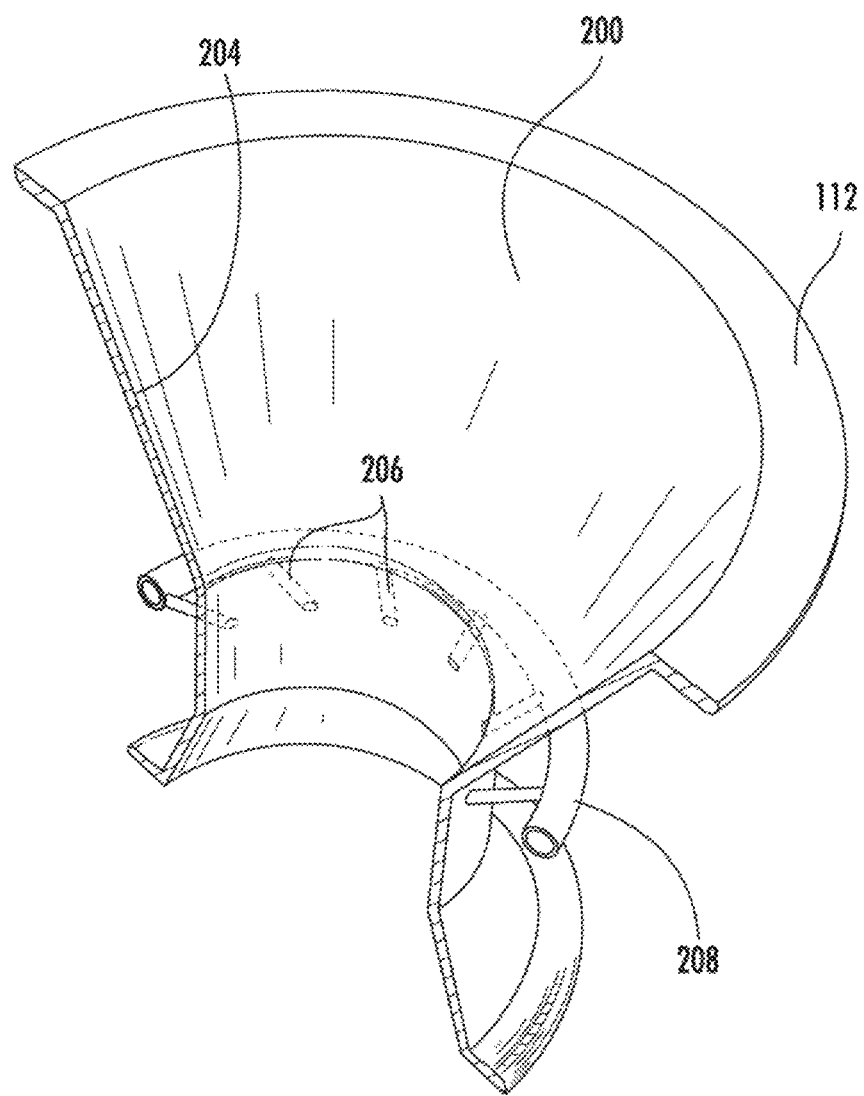
FIG. 8 is a fragmentary section illustrating the air flow in the configurations of FIGS. 5 through 7.
Figure 9:
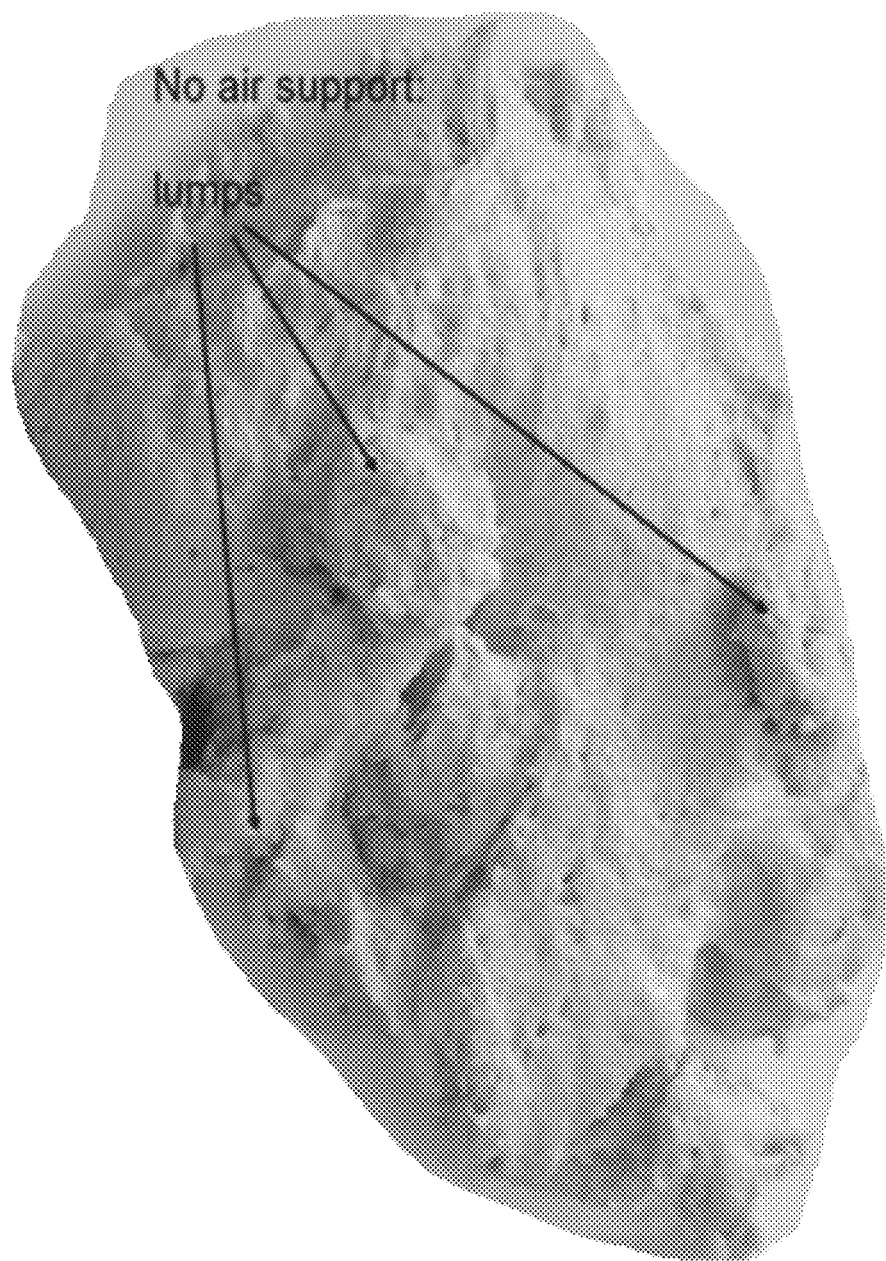
FIG. 9 is a photograph of dough made with prior art equipment without air augmentation; and, FIG. 10 is a photograph of dough made in prior art equipment modified with air augmentation according to the invention.
Figure 10:

FIGS. 8 and 9 are a comparison of dough made without air augmentation to fluidize the ingredients and with air augmentation according to the invention. In a 200 gram sample, the number of visible lumps or dough irregularities was reduced from 3 in the prior art dough to 0 in the air augmented dough.

It will also be appreciated that the augmented air for many ingredients should be provided from a source that is air dried so that the augmentation does not introduce moisture into the system.

Here again the air pressure is adjusted according to the dry ingredients being presented and the air pressure presented to the air augmentation inlet 210 is between 2 and 5 bar (approximately 30 to 70 PSI).

What we claim is:

1. An apparatus for hydrating dry ingredients, the apparatus comprising:
    a dry ingredients inlet;
    an intermediate segment that receives ingredients from the ingredients inlet in a free-falling flow;
    a diverter that is positioned in the intermediate segment and interferes with the free-falling ingredients;
    a pressurized air inlet that is positioned between the ingredients inlet and the diverter and causes turbulence in the free-falling ingredients;
    a hydration nozzle that is positioned in the intermediate segment and directs a hydration liquid at the ingredients; and,
    a mixing segment that receives hydrated ingredients from the intermediate segment.
2. The apparatus of claim 1, wherein the intermediate segment has a conical shape and the air inlet conforms to the conical shape of the intermediate segment.
3. The apparatus of claim 1, wherein the air inlet directs pressurized air toward the diverter.
4. The apparatus of claim 1, wherein the air inlet extends around the intermediate segment.
5. The apparatus of claim 4, wherein the air inlet supplies a plurality of air tubes that extend into the intermediate segment.
6. The apparatus of claim 5, wherein the air tubes are angled with respect to a vertical centerline through the intermediate segment.
7. The apparatus of claim 5, wherein the air tubes are angled toward the diverter.
8. The apparatus of claim 1, wherein the air inlet is generally circular.
9. The apparatus of claim 1, wherein the air inlet has a horse shoe shape.
10. The apparatus of claim 1, wherein the pressurized air is pressurized at between 30 and 70 PSI.
11. The apparatus of claim 1, wherein the pressurized air is pressurized at between 30 and 50 PSI.
12. The apparatus of claim 1, wherein the pressurized air is pressurized at between 35 and 45 PSI.
13. The apparatus of claim 12, wherein the air inlet extends around the intermediate segment and has at least one open end.
14. The apparatus of claim 13, wherein a relief valve in the at least one open end maintains the pressurized air at a predetermined air pressure range.
15. The apparatus of claim 1, wherein the pressurized air is dry air.
16. The apparatus of claim 15, wherein the hydration nozzle dispenses the hydration liquid at a pressure between 10 and 300 bar.
17. The apparatus of claim 1, wherein the hydration nozzle is positioned after the diverter.
18. An apparatus for hydrating dry ingredients, the apparatus comprising:
    a chamber body having an upper end and a lower end;
    a dry ingredients inlet at the upper end of the chamber body;
    an intermediate segment of the chamber body that includes a diverter that is arranged in the intermediate segment and directs dry ingredients toward an inner wall of the intermediate segment;
    a pressurized air inlet is positioned in the intermediate segment between the dry ingredients inlet and the diverter, and the pressurized air inlet causes turbulence in the free-falling ingredients; and,
    a hydration nozzle that is positioned in the intermediate segment and directs a hydration liquid at the ingredients after the ingredients pass the diverter.

* * * * *